United States Patent [19]
Rieger

[11] 3,908,452
[45] Sept. 30, 1975

[54] OVERLOAD TESTING OF CHAINS
[76] Inventor: Werner Rieger, Haus Haselbach, 7084 Unterkochen, Wurttemberg, Germany
[22] Filed: Dec. 6, 1973
[21] Appl. No.: 422,409

[30] Foreign Application Priority Data
Dec. 6, 1972 Germany.............................. 2260301

[52] U.S. Cl. .................................................. 73/143
[51] Int. Cl.² ........................................... G01N 3/08
[58] Field of Search .............. 73/95, 144, 158, 143; 116/DIG. 34; 294/74; 59/78, 93

[56] References Cited
UNITED STATES PATENTS
3,077,178    2/1963    Gordon .......................... 73/143 UX
FOREIGN PATENTS OR APPLICATIONS
139,131    5/1960    U.S.S.R................................ 73/143

*Primary Examiner*—Jerry W. Myracle
*Attorney, Agent, or Firm*—Smythe & Moore

[57] ABSTRACT

The invention relates to a device for and a method of testing whether the safe working load of the links of a chain, whether it be a lashing and/or a belaying chain, is being exceeded. The invention provides that an overload testing device is detachably connected in parallel with a portion of the chain length to two links of the chain to be tested so that the normal distance between said two links is reduced by the testing device and so that the links intervening between said two links are completely relieved of load. Advantageously the testing device includes at least one intermediate member which is visibly deformed when the safe working load of the links of the chain to be tested is exceeded. The invention also embraces a chain in combination with such an overload testing device.

2 Claims, 4 Drawing Figures

OVERLOAD TESTING OF CHAINS

The invention relates to a device for testing whether the safe working load of the links of a chain, whether a lashing and/or a belaying chain, is being exceeded and which gives an indication when this is the case.

Lashing and/or belaying chains are already known comprising an overload indicator consisting of two chain couplers which are connected to links of the lashing and/or belaying chain and which are connected by a ring-shaped overload indicating member. For example see German Gebrauchsmuster Specification No. 7.041 555.

This indicating device is a permanent element included in the load-transmitting links of the chain and it is replaced only when an overload has actually occurred.

Such an arrangement is not fully satisfactory when numerous lashing and/or belaying chains are in use, generally for purposes unlikely to give rise to conditions which would strain the chains beyond their safe working loads. In such circumstances the additional expense of providing a pair of chain couplers and the indicating member proper in each lashing and/or belaying chain would not be justifiable. Another reason why the permanent inclusion of an indicating device in the load-transmitting links of the chain is that the fatigue strength of the indicating element proper should in such a case be equal to that of the links of the belaying chain. In practice it is a matter of some difficulty to match the fatigue strength of these parts without incurring additional production expense.

It is an object of the present invention to provide an arrangement of the contemplated kind which does not invite the above mentioned objections, and which permits a simple overload test to be carried out only when this is required.

According to the invention this is achieved by a testing device which can be temporarily and detachably connected in parallel with a portion of a chain length, to two links of the chain to be tested, whether a lashing and/or a belaying chain, but between which two links the distance is so reduced by the testing device, that the intermediate links of the lashing and/or belaying chain spanning this distance in parallel with the testing device are completely relieved of the load.

The proposed arrangement has the advantage that the lashing and/or belaying chain can be used in the majority of cases without the overload testing device. Not until an occasion arises which suggests to the user that the safe working loard of the chain links might be exceeded, need the testing device be temporarily connected between two links of the belaying chain in order to find out whether or not the applied load is within the safe limits.

In a preferred embodiment of the invention the testing device comprises two chain-shortening dogs interconnected by at least one intermediate member, which member elongates to a visibly observable extent, when the safe working load of the links of the lashing and/or the belaying chain is exceeded.

A particularly simple arrangement is one in which the intermediate member consists of a length of chain comprising three links which have a tensile strength less than that of the links of the chain to be tested.

By subjecting the three chain links of the intermediate member to a suitable heat treatment and by giving them an appropriate shape it is possible to ensure that they will yield beyond their elastic limit when, and only when, the safe working load of the links of the lashing and/or belaying chain is exceeded.

The invention will be more particularly described with reference to the accompanying drawings in which.

Figure 1:
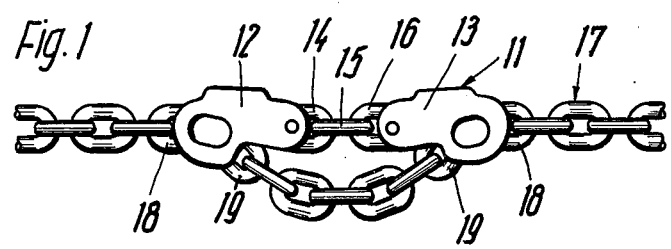
FIG. 1 is a side view of a portion of a lashing and/or belaying chain.
Figure 2:
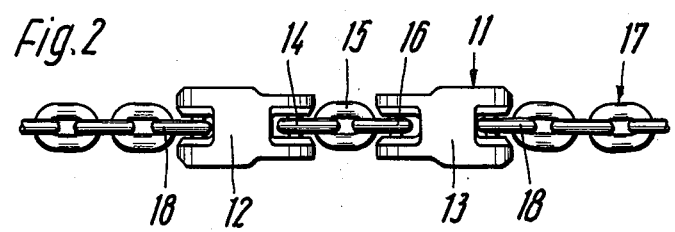
FIG. 2 is a view of the parts in FIG. 1 seen from above.
Figure 3:
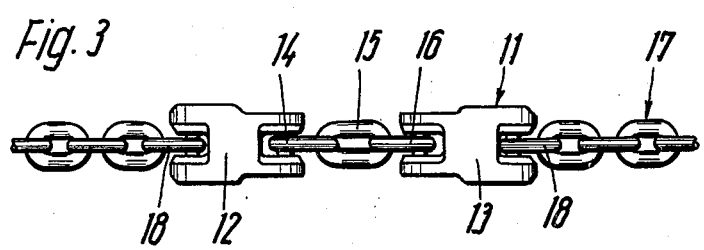
FIG. 3 is a similar view to that in FIG. 2 of the same parts after the safe working load of the links of the lashing and/or belaying chain has been exceeded.

Referring to the drawings, 11 generally designates an overload testing device which comprises two chain-shortening dogs 12 and 13 of conventional construction joined together by three chain links 14, 15 and 16 which have a tensile strength lower than that of the chain links of a lashing and/or belaying chain 17.

Figure 4:
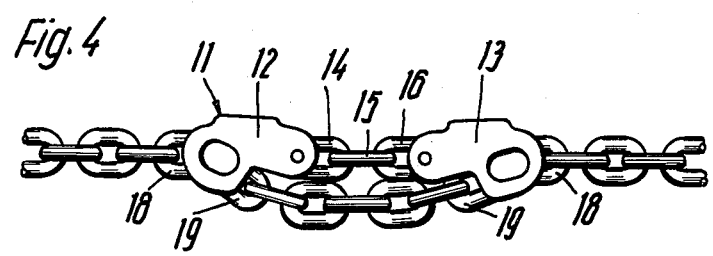
FIG. 4 is a view of the parts in FIG. 3 seen from the side.

The chain-shortening dogs 12 and 13 are hooked over the links which are not clearly seen in the drawing, but which connect the two links marked 18 and 19. As soon as the safe working load of the chain links of the lashing and/or belaying chain is exceeded the three chain links 14, 15 and 16 of the testing device 11 yield beyond their elastic limit and elongate. This elongation is immediately visible not only by direct inspection of the three links 14 to 16 but also by virtue of some of the slack of the unloaded portion of the lashing and/or belaying chain 17 having been taken up, as will be readily seen when FIGS. 1 and 4 are compared.

Since the testing device need be used only once, for instance when repeatedly hoisting like loads, in order to test the lashing and/or belaying chain for its safe load-bearing capacity, the fatigue strength of the links 14 to 16 of the testing device may be less than the fatigue strength of the links of the lashing and/or belaying chain.

Advantageously, the links 14 to 16 of the testing device 11 may be so heat treated as to ensure that these links will in fact yield beyond their elastic limit at the desired safe loading limit.

In order to identify the overload testing device so that it will not be mistaken for an ordinary chain-shortening unit of the usual kind, the testing device should preferably be painted a suitable colour or provided with an identifying tag of some kind.

I claim:

1. A device for visually indicating the safe working load of a chain including interconnected links comprising a pair of chain-shortening dogs removably attachable to two spaced links of said chain, said dogs being interconnected by chain links, at least one of said last-mentioned links having a tensile strength less than the links of said chain whereby elongation thereof occurs when the safe working load on said chain links has been exceeded, said dogs being interconnected to said chain links so that the chain links intervening therebetween will be slack enabling any change in shape of said chain-shortening dog links to be visible.

2. In a device according to claim 1 wherein said chain-shortening dogs are removably sleeved over the two spaced links of said chain.

* * * * *